United States Patent [19]

Harvey

[11] Patent Number: 5,165,366
[45] Date of Patent: Nov. 24, 1992

[54] OUTDOOR WINDOW MOUNTED LITTER UNIT

[76] Inventor: Steven J. Harvey, P.O. Box 811, Molalla, Oreg. 97038

[21] Appl. No.: 835,863

[22] Filed: Feb. 18, 1992

[51] Int. Cl.⁵ ............................................. A01K 29/00
[52] U.S. Cl. ...................................... 119/165; 119/15
[58] Field of Search ............... 119/161, 163, 165, 166, 119/167, 168, 15, 17, 19; 47/33, 68; D30/108, 119, 114

[56] References Cited

U.S. PATENT DOCUMENTS

| | | |
|---|---|---|
| D. 202,058 | 8/1965 | D'Amato . |
| D. 285,847 | 9/1986 | Read . |
| D. 297,625 | 9/1988 | Lehman . |
| D. 308,495 | 6/1990 | Honeycutt . |
| D. 317,216 | 5/1991 | Cutrone ............................. D30/109 |
| 2,932,279 | 4/1960 | Giles ..................................... 119/19 |
| 2,963,003 | 12/1960 | Oberg et al. . |
| 2,971,493 | 2/1961 | Robb . |
| 3,141,441 | 7/1964 | Russell . |
| 3,818,865 | 6/1974 | Sinclair . |
| 4,021,975 | 5/1977 | Calkins ................................. 119/19 |
| 4,291,645 | 9/1981 | Cruchelow et al. .................. 119/19 |
| 4,445,459 | 5/1984 | Julie ....................................... 119/19 |
| 4,696,257 | 9/1987 | Neary et al. ....................... 119/19 X |
| 4,788,934 | 12/1988 | Fetter ................................. 119/19 X |
| 4,989,546 | 2/1991 | Cannady .............................. 119/19 |
| 5,092,270 | 3/1992 | Simons et al. ........................ 119/19 |

Primary Examiner—Gene Mancene
Assistant Examiner—Thomas Price
Attorney, Agent, or Firm—Richard C. Litman

[57] ABSTRACT

A window mounted, ventilated, litter unit for installation on the outer wall of a house, to be used with conventional horizontal or vertical slide windows. A frame is constructed of square, thin wall steel tubing and has walls made of acrylic to allow sunlight within while keeping a cat safe. A swinging access door is provided at the window opening. The floor of the litter unit has a screen of perforated material which allows for the ventilation of litter which is maintained in a litter pan below the floor, and for litter tracked onto the floor to fall through the floor into the litter pan. The litter pan is easily removed from the bottom of the litter unit for outdoor cleaning. The rear of the litter unit has an upper support portion as part of the unit rear wall; the entire rear wall is dimensioned to completely surround a window opening so the invention may be used with windows that slide vertically or horizontally, without need of altering the litter unit or the window in any way.

19 Claims, 6 Drawing Sheets

OUTDOOR WINDOW MOUNTED LITTER UNIT

BACKGROUND OF THE INVENTION

1. Field of the Invention

This invention relates generally to a receptacle for the excrement of cats, and, particularly, to a ventilated, outdoor, window mounted litter unit.

2. Description of the Prior Art

Cats confined to the inside of a house or apartment are usually provided with a separate area for excreting. Typically, a pan containing an absorbent "sand"-like material known as litter, is provided and is used by the cat during excretion. The offensive odor from this area often permeates through the entire house or apartment. The frequent use of the same litter by a cat causes the litter to become very wet, further causing the offensive odor to develop.

Various types of deodorizing litter have been used by cat owners to inhibit this odor, although unpleasant odors continue to develop.

Another concern is that cats scatter the litter on the floor around the outside of the pan and elsewhere around the home, due to the pawing and tracking by the cat. Various patented ideas have been developed to limit litter from being scattered, and to confine all of the litter to a litter unit located indoors.

Cages of various sorts have also been developed to confine cats, particularly when the cat owner has a visitor in his or her home which is allergic to cats, and to provide a place for the cat to excrete waste.

The present invention solves the problems associated with prior devices by providing a litter unit that uses outdoor ventilation and evaporation to release all odor associated with a litter unit, confining all litter to the outdoors. This litter unit provides a safe, accommodating area to temporarily isolate a cat, and, none of the prior devices known to applicant, taken singly or in combination disclose the construction of the invention.

SUMMARY OF THE INVENTION

The invention is mounted to the outside of an existing window frame and can be used with windows that slide vertically or horizontally. The outdoor litter unit has a frame having walls made of acrylic material, keeping the cat safe within the unit while allowing sunlight to shine therein. A swinging access door is provided in an acrylic panel at the window opening. The litter unit has a floor made of perforated material which allows for ventilation and for tracked litter to fall through into a litter pan underneath the floor. The litter pan is easily removed from the bottom of the litter unit for outdoor cleaning.

Accordingly, the principal object of the invention is to provide a litter unit that uses outdoor ventilation and evaporation to release all odor associated with a litter unit, while confining all litter to the outdoors.

Another object of the invention is to provide a safe, accommodating area to temporarily isolate a cat.

Another object of the invention is to provide a sanitary environment for a cat owner, wherein a pan is provided with litter or excrement.

Another object of the invention is to maximize the use of litter by enabling the excrement moisture to evaporate.

Another object of the invention is to disburse odors associated with a litter unit.

Yet a further object of the invention is to provide an outdoor, window mounted litter unit secured to a structure by four simple bolts, and having a rear frame surrounding the window opening, so that the unit may be mounted exteriorly of windows that slide either vertically or horizontally, without need of altering the invention or the window in any way whatsoever.

These and other objects, advantages, and features of the invention, will become apparent from the drawing, description and claims herein.

BRIEF DESCRIPTION OF THE DRAWINGS

Like numerals refer to like parts throughout the accompanying description.

DETAILED DESCRIPTION OF THE PREFERRED EMBODIMENTS

Figure 1:
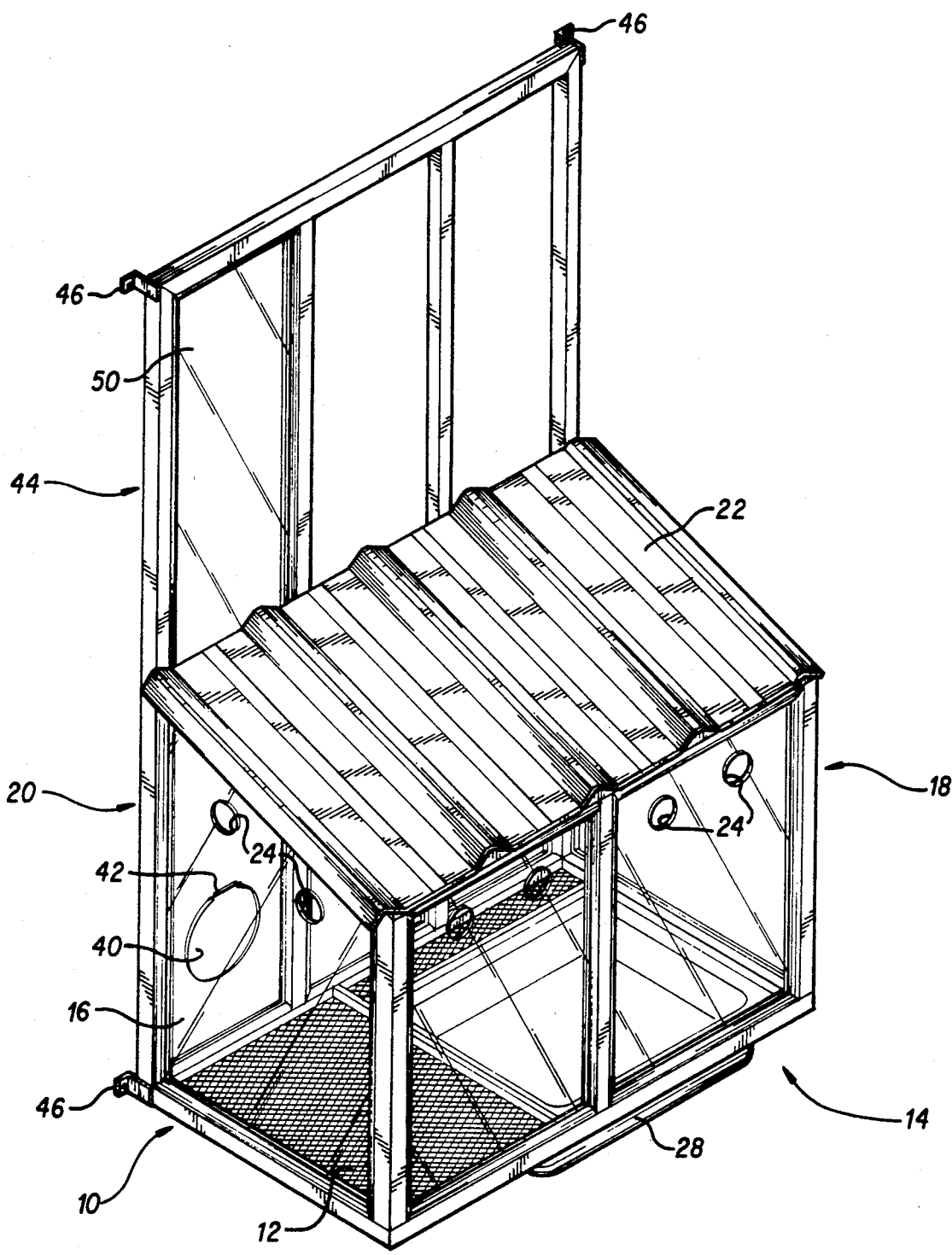
FIG. 1 is a perspective view of a preferred embodiment of the invention.
Figure 2:
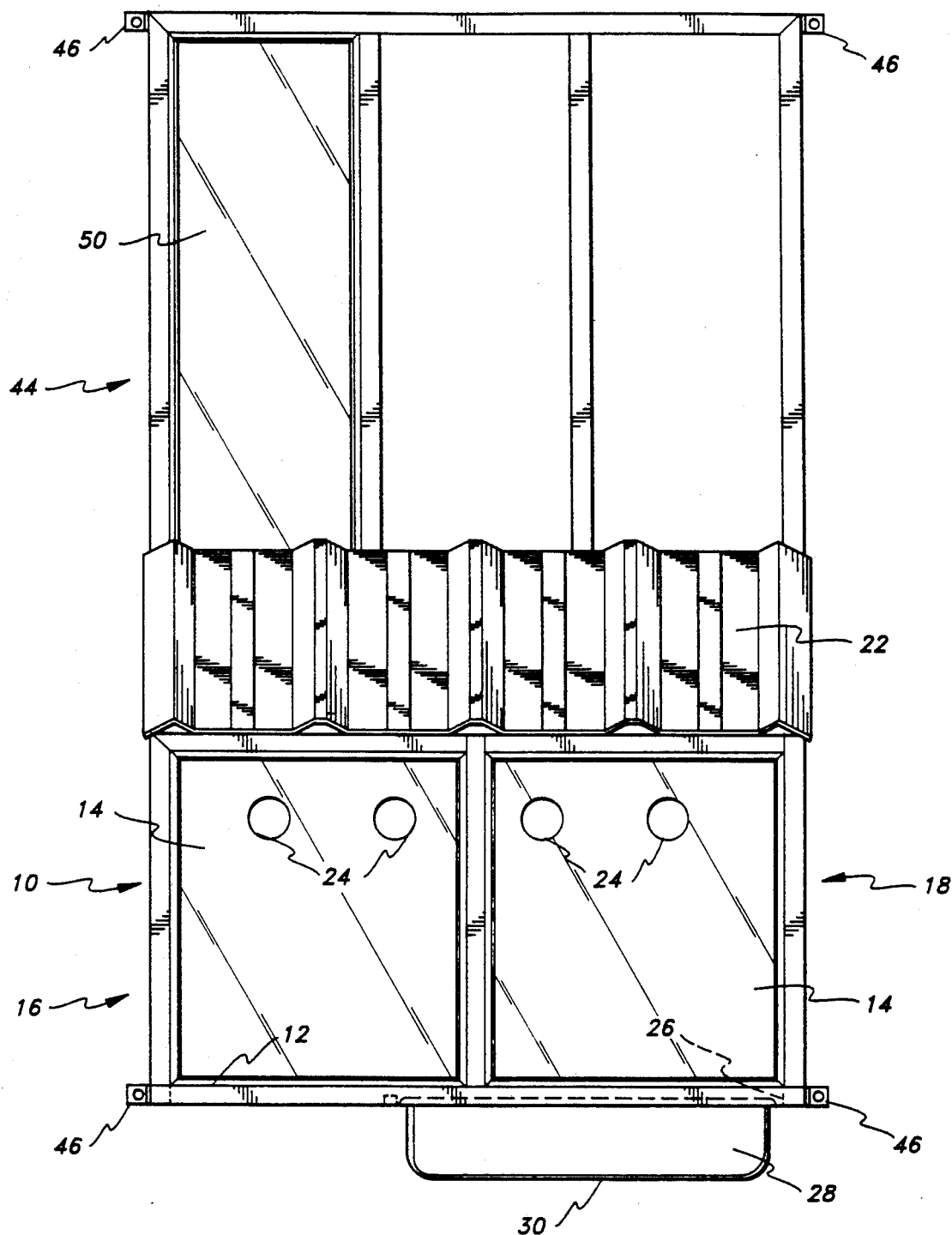
FIG. 2 is a front elevational view of the invention as shown in FIG. 1.

Referring now to the drawings, outdoor litter unit 10 is intended to be used with a standard three foot by five foot horizontal or vertical slide window that is commonly used in homes. The unit 10 is thus dimensioned and configured so as to be mounted easily upon virtually any style of window without need of altering either the window or the litter unit 10.

The basic components of litter unit 10 are an enclosure defined by a floor 12, a front wall 14, a pair of side walls 16, 18, and a rear wall 20. The walls are surmounted by a lean-to roof 22 to complete the enclosure. Preferably, floor 12 is made of open mesh material, such as flat spreaded sheet steel, 13 gauge, to provide an open form for litter spread by the pet to fall from the enclosure. Also, the open mesh floor 12 greatly assists in ventilation of the enclosure interior. The various walls of the enclosure are defined by sheets of transparent material, acrylic material being preferred, to allow sunshine to enter and brighten the enclosure, and also minimize the loss of sunlight through the window opening to which the invention is attached or mounted. For even more effective ventilation of the enclosure, the front wall 14 and the side walls 16, 18 may be apertured as indicated at 24.

Figure 5:
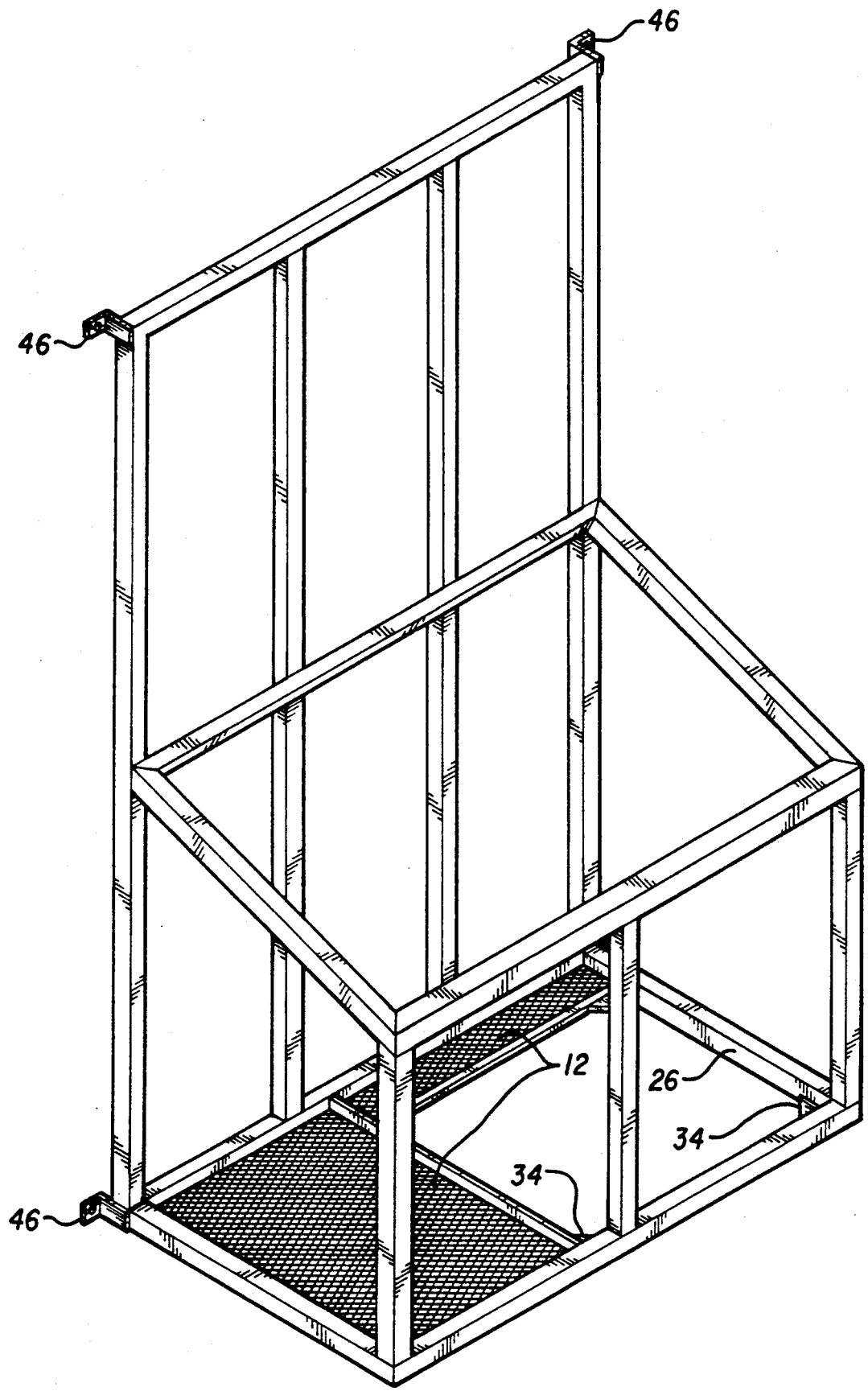
FIG. 5 is a perspective view similar to FIG. 1, with the roof, walls and litter pan removed to reveal the basic frame structure of the invention.
Figure 6:
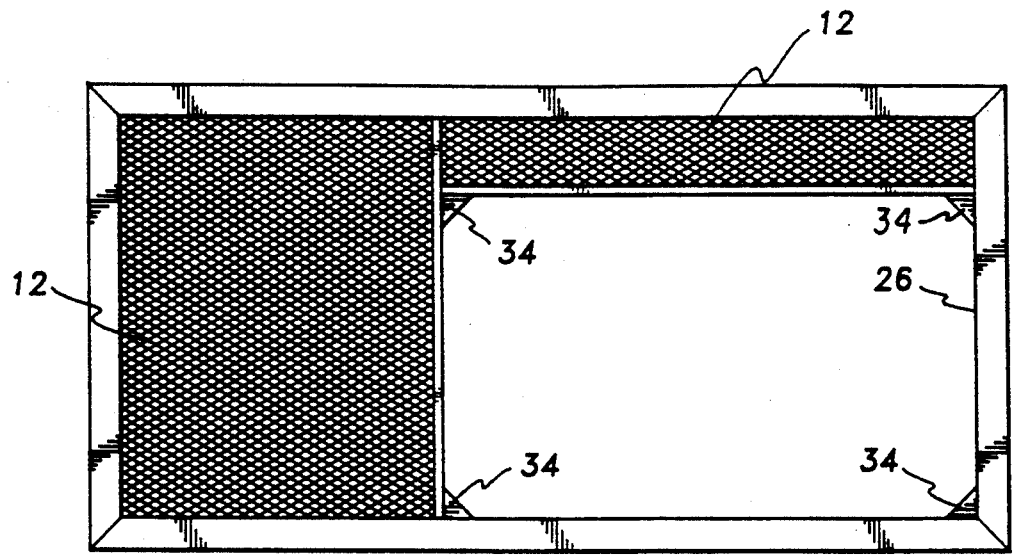
FIG. 6 is a top plan view of the floor of the invention, with vertical frame members removed for clarity of the view.
Figure 7:
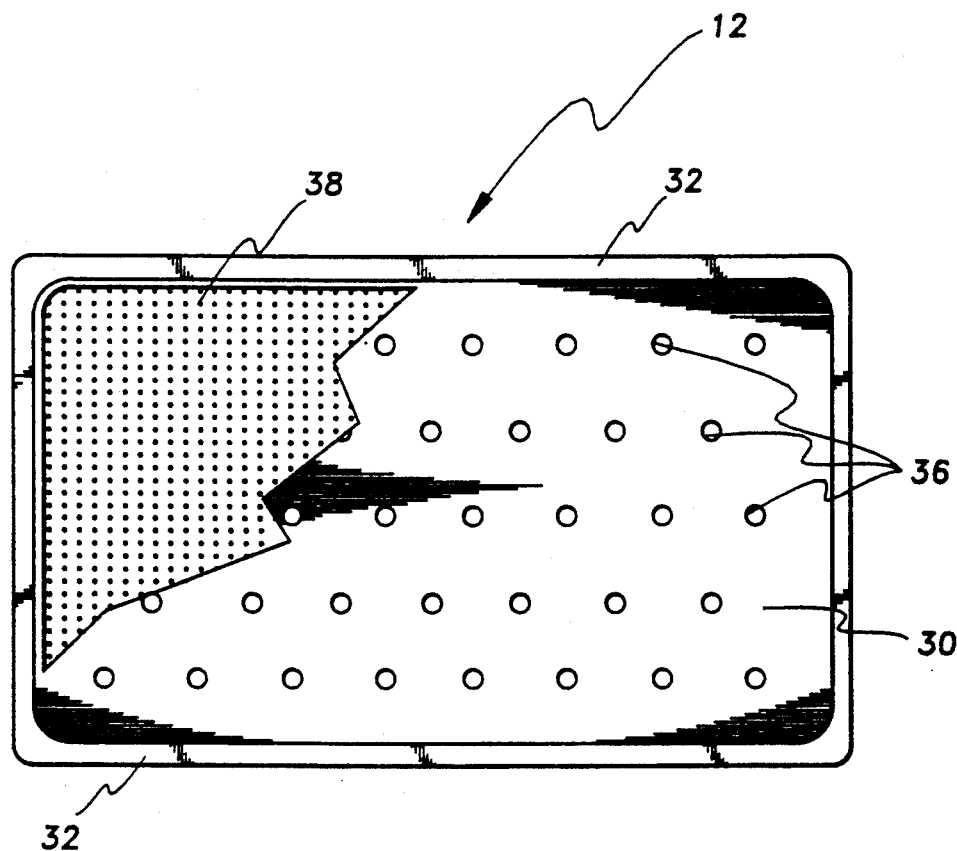
FIG. 7 is a top, plan view of an alternative embodiment of a litter pan construction of the invention, drawn to an enlarged scale.

With reference to FIG. 5, it is readily appreciated that the framework making up the skeleton of litter unit 10 is, in the preferred embodiment, made of relatively thin wall square steel tubing stock, e.g., 1" by 1" square tubing, the various pieces being welded together. Floor 12 includes border pieces of ½" by ½" square steel tubing completing the definition of an opening 26 which receives a removable litter pan 28. Pan 28, as best seen in FIG. 7, is a relatively shallow pan having a base 30 and a peripheral flange 32. With reference to FIG. 6, pan 28 is suspended in opening 26 by four corner gussets 34. Since both opening and pan are rectangular, it is easy to simply raise the pan 28 just a little, turn and tilt the same, and then lower the pan 28 down through the opening 26 for cleaning and refilling with fresh cat litter material (not shown).

With further reference to FIG. 6, floor 12 is made of two pieces of mesh material, so as to be L shaped, when viewed from the side. This construction locates opening 26, and thus pan 28, as far forward within unit 10 as possible, so as to further minimize odors from the pan entering through the window where the unit is mounted and into the structure or home.

Referring again to FIG. 7, alternative embodiments of pan 28 are shown. If desired, base 30 of pan 28 may be perforated as at 36 to permit moisture, particularly feline urine, to drain through pan 28. In order to prevent cat litter from also passing through the perforations 36, a screen 38, e.g., 0.030 perforated steel sheet or the equivalent, may be placed in the bottom of pan 28, on base 30. A portion of screen 38 is indicated in FIG. 7.

Figure 3:
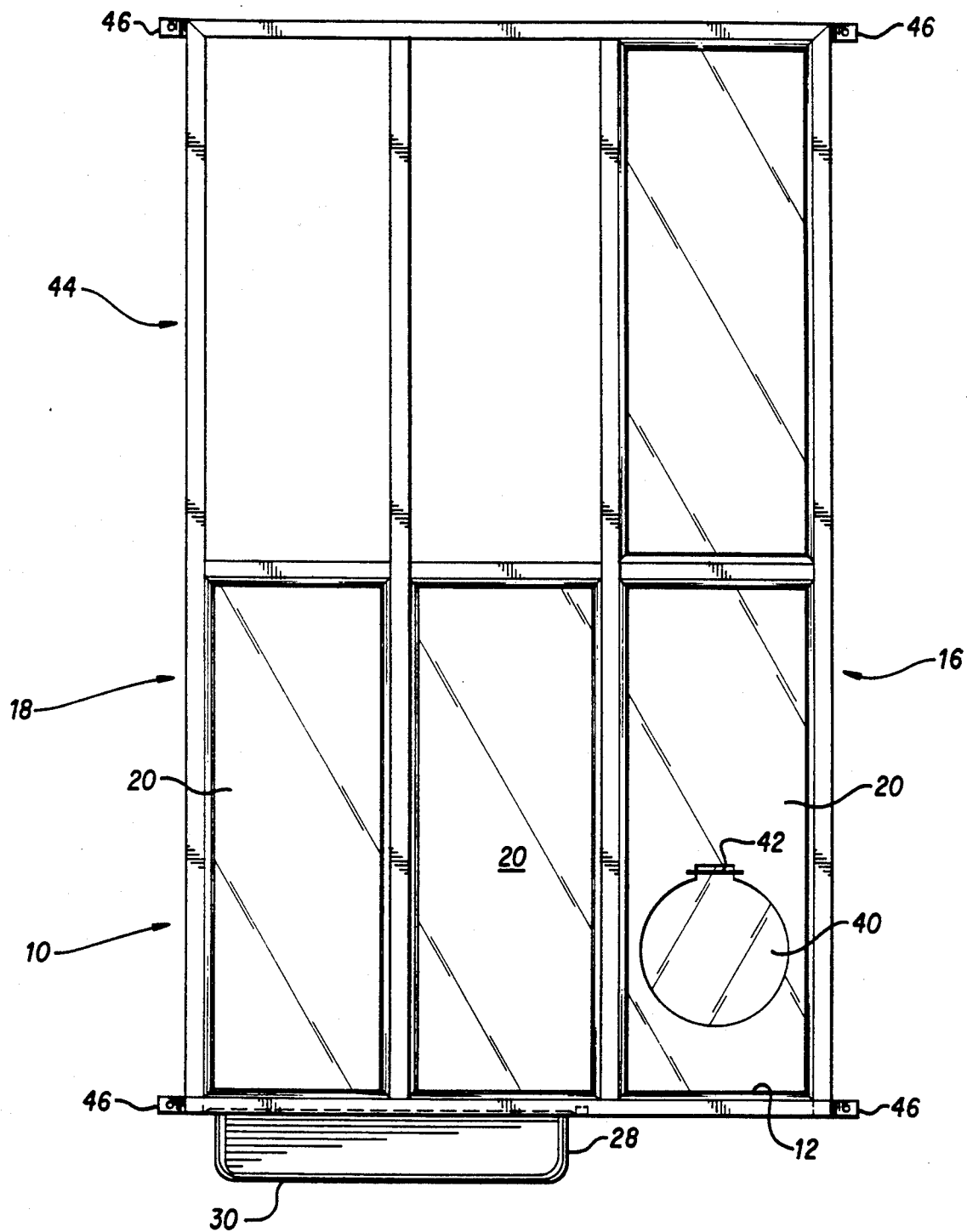
FIG. 3 is a rear elevational view of the invention as illustrated in FIG. 1.

Turning now to FIGS. 1 and 3, rear wall 20 is made up of three solid panels, in order to protect the inside of the structure or home from the elements. Ingress and egress into and out of the enclosure is provided by a pet door 40 of attractive, circular configuration, spring hinged at 42 to a closed state, as shown.

Figure 4:
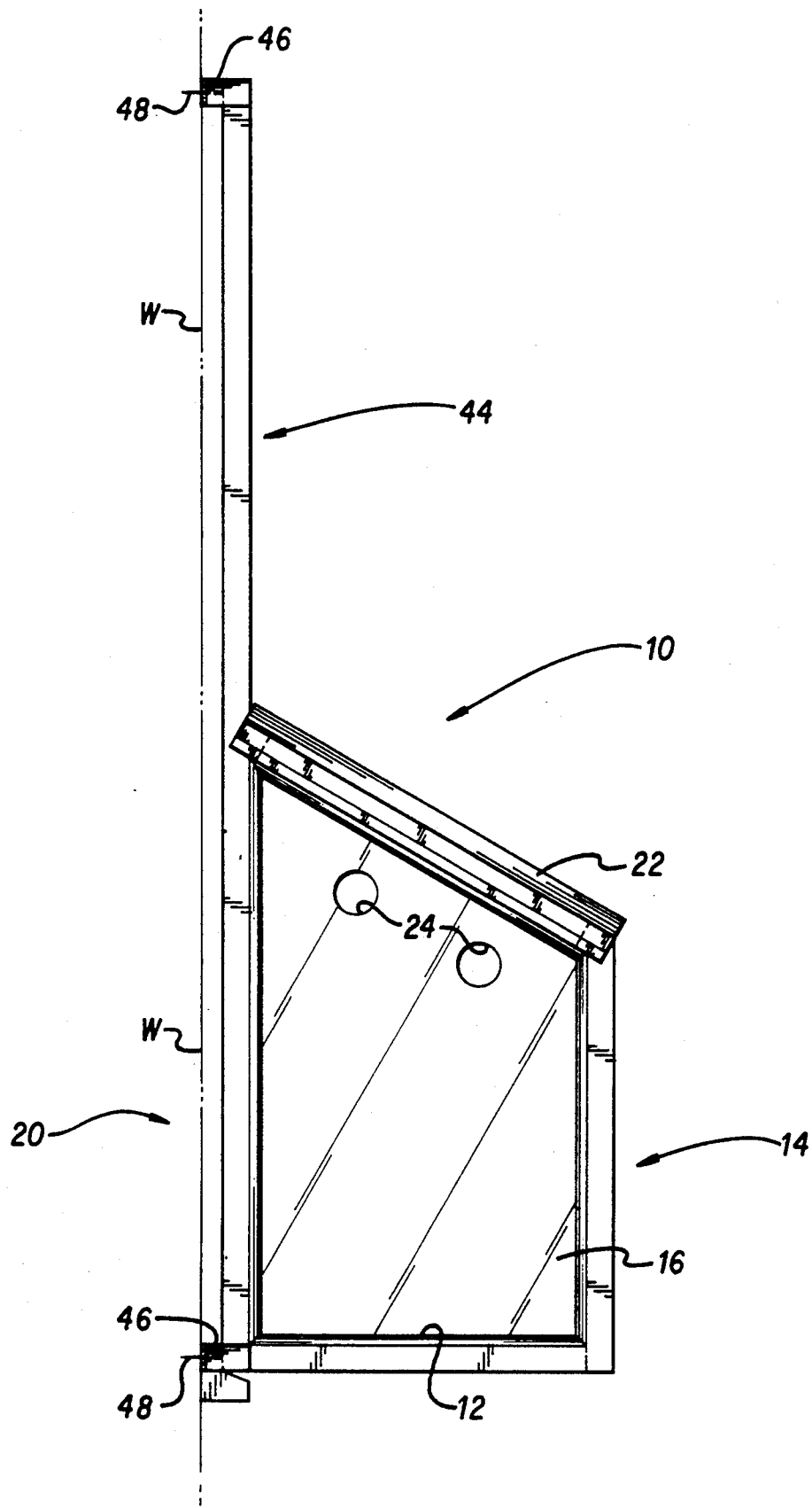
FIG. 4 is a left side elevational view of the invention as seen in FIG. 1.

With particular reference to FIGS. 1 and 4, it is seen that rear wall 20 includes an upper support portion or extension 44. This provides a rear wall unit that is 5 feet high and three feet wide, in the preferred embodiment. Mounting lugs 46 are provided at the four corners of the combined unit 20, 44, for attachment of unit 10 about the periphery of a window W (FIG. 4) as by lag bolts 48 or the like, two of which are seen in FIG. 4. Also, a section of upper extension 44 is provided with a transparent barrier 50, which preferably is made of transparent acrylic material as in the case of the walls 14, 16, 18, and 20. Thus the unit 10 may be mounted over a window with either vertically or horizontally sliding sections, without need of altering either the window W or the unit in any fashion whatsoever. When used with a window that slides horizontally, the upper barrier 50 provides protection of the interior of the home or structure from the elements. It is noted here that barrier 50 is placed directly above the pet opening or door 40.

The description of the preferred embodiments is an example of the invention as defined within the claims appended hereto. Other versions of the invention within the spirit of these claims are considered within the scope of this invention.

I claim:

1. A window mounted outdoor litter unit, comprising:
   an enclosure projecting into the outside area, beyond a window opening;
   said enclosure having an openable door separating the enclosure from the interior of a structure;
   said enclosure having a floor, there being perforations therethrough;
   said enclosure having a removable pan for holding litter, said pan including a base and an upper, peripheral flange means; and
   means defining an opening in said floor for engaging said pan peripheral flange means, with said pan base being located below said floor, for holding litter, said pan being removable through said floor for emptying and cleaning;
   whereby an animal can be isolated within the enclosure from the interior of a structure in said enclosure, and utilize said pan for defecation and urination, whereafter said pan is removable from the outside of the structure, downwardly through said enclosure floor opening means, for cleaning, and replaced for repeat use by being inserted upwardly through said opening means and repositioned with said pan peripheral flange seated on said opening means.

2. The invention as claimed in claim 1 wherein in said enclosure has upstanding walls, said walls being constructed of transparent material to permit the flow of sunlight therethrough, at least one of said walls having aperture vent means formed therethrough.

3. The invention as claimed in claim 2 wherein said walls are surmounted by a lean-to roof.

4. The invention as claimed in claim 2 wherein all of said walls are constructed of transparent acrylic material, said walls comprising a front wall, two side walls and a rear wall adjacent a structure window opening, said rear wall being solid, said openable door being mounted in said rear wall for ingress and egress of a pet to and from said litter unit, each of said side walls and said front wall having said aperture vent means formed therethrough.

5. The invention as claimed in claim 1 wherein said pan is of generally rectangular configuration and wherein said opening means further comprises gusset means therein for supporting said pan at the corners thereof, said flange means resting upon said gusset means.

6. The invention as claimed in claim 5 wherein said floor further comprises a first section located adjacent one of said side walls and a second section spacing said opening means from a structure window opening, whereby said pan is supported in said opening means away from a structure window opening.

7. The invention as claimed in claim 1 wherein said pan base further includes means defining a plurality of openings therethrough, for drainage of moisture from said litter unit and for ventilation of said litter unit.

8. The invention as claimed in claim 7 wherein said pan further comprises a layer of sheet screen material laid therewithin on said pan base, for retaining litter within said pan and permitting moisture to drain therethrough and through said plurality of openings.

9. A window mounted outdoor litter unit, comprising:
   an enclosure projecting into the outside area, beyond a window opening;
   said enclosure having a floor, there being perforations therethrough;
   said enclosure having a removable pan for holding litter;
   said enclosure being defined by four upstanding walls, said floor and a roof surmounting said walls;
   said walls comprising a front wall, a pair of side walls and a rear wall arranged adjacent a structure window opening; said rear wall further comprising an upper support portion extended above said roof, and means for securing said upper support portion to a structure window opening; and
   said rear wall and rear wall upper support portion being bordered by frame means dimensioned and configured to surround a structure window opening.

10. The invention as claimed in claim 9, wherein each of said walls is constructed of transparent material to permit the flow of sunlight therethrough, said side walls and front wall having aperture vent means formed therethrough, said rear wall being solid and having said openable door mounted therein, for ingress and egress of a pet to and from said litter unit.

11. The invention as claimed in claim 10 wherein said rear wall upper support portion includes a transparent, solid material barrier therewithin, extending the full length of said upper support portion and across a predetermined width of said upper support portion.

12. The invention as claimed in claim 2 wherein said walls are surmounted by a lean-to roof.

13. The invention as claimed in claim 9 wherein said pan is of generally rectangular configuration and wherein said opening means further comprises gusset means therein for supporting said pan at the corners thereof, said flange means resting upon said gusset means.

14. The invention as claimed in claim 13 wherein said floor further comprises a first section located adjacent one of said side walls and a second section spacing said opening means from a structure window opening, whereby said pan is supported in said opening means away from a structure window opening.

15. The invention as claimed in claim 9 wherein said pan base further includes means defining a plurality of openings therethrough, for drainage of moisture from said litter unit and for ventilation of said litter unit.

16. The invention as claimed in claim 15 wherein said pan further comprises a layer of sheet screen material laid therewithin on said pan base, for retaining litter within said pan and permitting moisture to drain therethrough and through said plurality of openings.

17. A window mounted outdoor litter unit, comprising:
   an enclosure projecting into the outside area, beyond a window opening;
   said enclosure having an openable door separating the enclosure from the interior of a structure;
   said enclosure having a floor, there being perforations therethrough;
   said enclosure having a removable pan for holding litter, said pan including a base and an upper, peripheral flange means,
   means defining an opening in said floor for engaging said pan peripheral flange means, with said pan base being located below said floor, for holding litter, said pan being removable through said floor for emptying and cleaning;
   whereby an animal can be isolated within the enclosure from the interior of a structure in said enclosure, and utilize said pan for defecation and urination, whereafter said pan is removable from the outside of the structure, downwardly through said enclosure floor opening means, for cleaning, and replaced for repeat use by being inserted upwardly through said opening means and repositioned with said pan peripheral flange seated on said opening means;
   said enclosure having upstanding walls, said walls being constructed of transparent material to permit the flow of sunlight therethrough, said walls comprising a front wall, two side walls and a rear wall adjacent a structure window opening, said rear wall being solid, said openable door being mounted in said rear wall for ingress and egress of a pet to and from said litter unit, each of said side walls and said front wall having said aperture vent means formed therethrough, said upstanding walls being surmounted by a roof, said rear wall further comprising an upper support portion extended above said roof, and means for securing said upper support portion to a structure window opening;
   said rear wall upper support portion including a transparent, solid material barrier therewithin, extending the full length of said upper support portion and across a predetermined width of said upper support portion;
   said rear wall and rear wall upper support portion being bordered by frame means dimensioned and configured to surround a structure window opening;
   said pan being of generally rectangular configuration and said opening means further comprising gusset means therein for supporting said pan at the corners thereof, said flange means resting upon said gusset means; and
   said floor further comprising a first section located adjacent one of said side walls and a second section spacing said opening means from a structure window opening, whereby said pan is supported in said opening means away from a structure window opening.

18. The invention as claimed in claim 17 wherein said pan base further includes means defining a plurality of openings therethrough, for drainage of moisture from said litter unit and for ventilation of said litter unit.

19. The invention as claimed in claim 18 wherein said pan further comprises a layer of sheet screen material laid therewithin on said pan base, for retaining litter within said pan and permitting moisture to drain therethrough and through said plurality of openings.

* * * * *